E. H. ASHCROFT.
Peat Machine.
No. 54,088.
Patented Apr. 24, 1866.
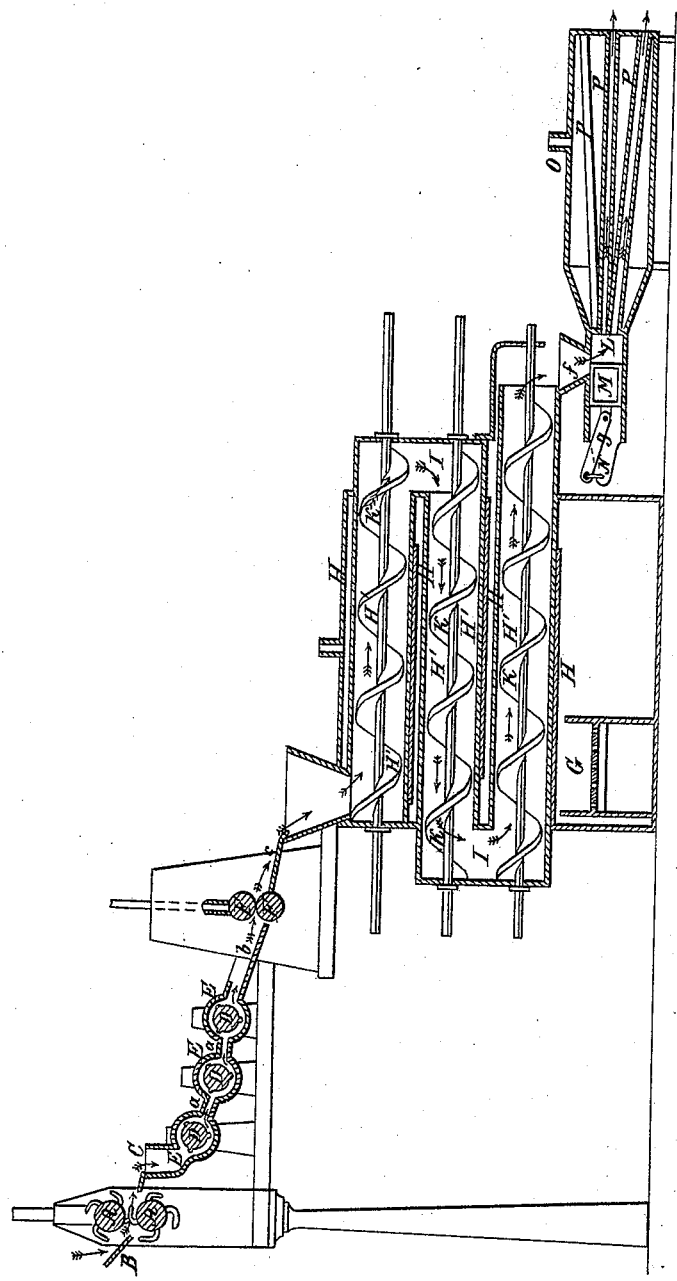
Witnesses:
Samuel N. Piper
George Andrews
Inventor:
E. H. Ashcroft
by his Attorney
R H Eddy

UNITED STATES PATENT OFFICE.

EDWD. H. ASHCROFT, OF LYNN, MASSACHUSETTS.

IMPROVED MACHINE FOR PREPARING PEAT.

Specification forming part of Letters Patent No. 54,088, dated April 24, 1866.

*To all whom it may concern:*

Be it known that I, EDWARD H. ASHCROFT, of Lynn, in the county of Essex and State of Massachusetts, have made a new and useful invention for Treating and Preparing Peat for Use as a Fuel; and I do hereby declare the same to be fully described in the following specification and represented in the accompanying drawing, which is a longitudinal section of the apparatus employed in carrying out my invention.

The object of such invention is to accomplish the expulsion of water from the material and to compress such material into a form or forms favorable for transportation and use of it.

In the drawings, A A are two feed-rollers, one of which is placed over the other, each being furnished with strong teeth projecting from its periphery. These rollers may have a chute, B, in rear of them, and they are to have mechanism applied to them to revolve them in a manner to cause them to catch and feed forward any peat when presented between them by being placed in the chute and suffered to pass down the same.

In front of and below the upper of the said feed-rollers is a conductor, C, leading into the foraminous case E of the first of a series of revolving toothed rools or beaters, D D D. Each of these beaters is placed within one of three foraminous cases, E E E, which are connected by conduits $a\ a$. The last of these cases has a spout or chute, $b$, leading from it to a pair of squeeze and feed rollers, F F, from which a chute, $c$, leads to the hopper $d$ of a drying apparatus. The said drying apparatus consists not only of a furnace, G, having a serpentine flue, H, leading from it, but of a series of cylinders or cases, H' H' H', running through the said flue and communicating with each other by means of chambers or conduits I I, the whole being arranged as represented. In each of the cases H' H' H' there is a screw, K, which may be provided with mechanism for putting it in revolution, the purpose of such screw being to move the material which may be received into the cylindrical case at one end of it toward and so that it shall be discharged at the other end of it. The furnace serves to heat the external surfaces of the cases H' H' H', and in consequence thereof to cause the moisture in the peat in such cases to be dried out of it, and to escape through the hopper or by suitable apertures leading from the cases. The lowermost of the cases H' opens into a hopper or spout, $f$, leading into a cylinder, L, provided with a piston, M, which is connected with a cranked shaft, N, by means of a connecting-rod, $g$. The cylinder opens at its front end into the end of a cylindro-conical vessel, O, which is to be charged with steam from a boiler or with heated air from a suitable air-heater. Opening out of the cylinder, and leading through the drying-vessel O, is a series of pipes, P P P, through which the material received into the cylinder will be driven by the action of the piston within or during its advance in the cylinder. Thus, by means of the compressing and forming apparatus—consisting of the piston, the cylinder, and its educts, with the steam-vessel containing such educts—the material received into the cylinder will be reduced to a series of cylinders or round sticks.

The pipes or tubes P, running through drying vessel or cylinder O, and through which the peat passes, may be perforated by small holes, so that the moisture of the peat may be more readily absorbed by the temperature of the steam surrounding said pipes.

In place of the centrifugal machines or toothed rollers and their foraminous cases, as hereinbefore described, I have contemplated the employment of one or more centrifugal machines, such as are generally used for freeing sugar from molasses or sirup.

I claim—

1. The mode substantially as above described of treating or preparing peat, the same consisting in breaking it up and discharging water from it by one or more centrifugal machines, or the same and a set of squeeze-rollers, and subsequently passing it through a drying apparatus, and from thence into and through a compressing apparatus, whereby it may be compressed into such shape or shapes as may be required.

2. The combination of the feed-rollers, one or more centrifugal machines, as described, a set of squeeze-rollers, and a drying apparatus, the whole being to operate substantially as and for the purpose specified.

3. The combination of the feed-rollers, one or more centrifugal machines, as described, a set of squeeze-rollers, a drying apparatus, and a compressing mechanism or apparatus, the whole being substantially as and for the purpose hereinbefore specified.

4. The compressing apparatus, made substantially in the manner and so as to operate as described.

5. The drying apparatus as made substantially in manner and so as to operate as described.

6. The centrifugal machine composed of the toothed cylinder or its equivalent and the foraminous case, arranged and applied together substantially in manner and so as to operate as specified.

7. The use of perforated tubes P in drying-cylinder O to assist in absorption of moisture of peat in said tubes by temperature of surrounding steam.

E. H. ASHCROFT.

Witnesses:
R. H. EDDY,
F. P. HALE, Jr.